Patented Jan. 27, 1953

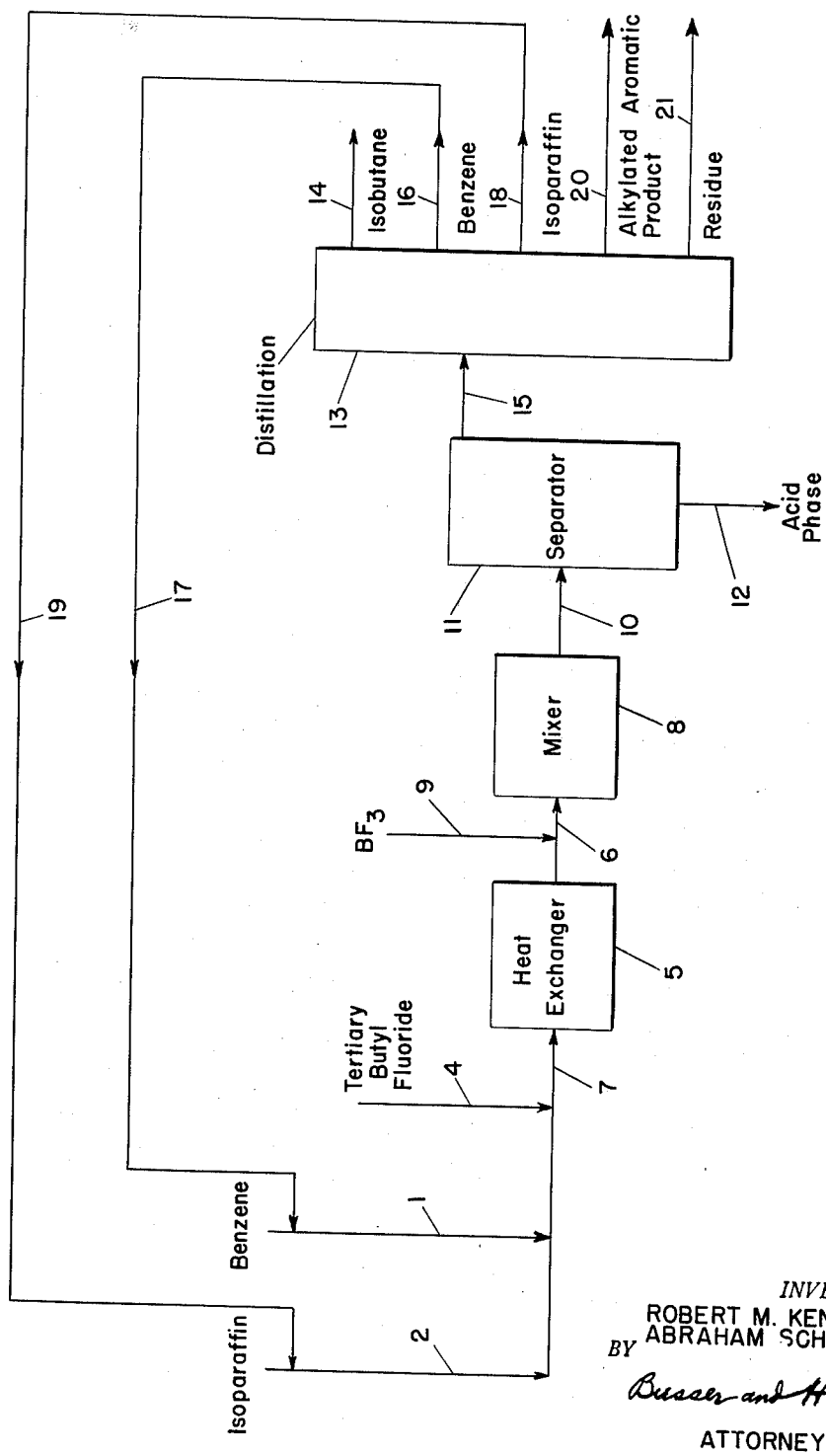

2,626,966

UNITED STATES PATENT OFFICE 2,626,966

ALKYLATION OF AROMATIC HYDROCARBONS

Robert M. Kennedy, Newton Square, and Abraham Schneider, Philadelphia, Pa., assignors to Sun Oil Company, Philadelphia, Pa., a corporation of New Jersey Application December 3, 1949, Serial No. 130,926

20 Claims. (Cl. 260—668)

This invention relates to a catalytic alkylation process, and more particularly to the alkylation of aromatics with isoparaffins under novel catalytic conditions.

Aromatics have heretofore been alkylated with paraffins or naphthenes by what is known as the Friedel-Crafts reaction. This reaction, as is well known, involves a two-step process wherein the paraffin is chlorinated with chlorine gas, and the alkyl halide thus formed is joined to the aromatic compound by use of a metal halide, such as aluminum chloride. In this process, the chlorine is irreversibly converted to hydrogen chloride and as such presents a disposal problem; the metal halide catalyst is deactivated in the reaction, being converted to a complex form from which its regeneration is difficult and uneconomical. Furthermore, in processes involving the use of aluminum chloride and similar metal halides, it is essential to successful operation that intimate contact between two immiscible phases be attained. Mechanical agitators are usually employed in an attempt to secure such intimate contact, but are inefficient and expensive.

It has now been discovered that alkylatable aromatics can be alkylated with saturated hydrocarbons containing at least one tertiary hydrogen atom per molecule, such as isoparaffins which contain at least one tertiary hydrogen atom per molecule, by subjecting a mixture of such isoparaffins and aromatics to the simultaneous action of a tertiary fluoride and boron trifluoride. According to the invention, when a tertiary fluoride and BF₃ are brought together in the presence of an alkylatable aromatic and a tertiary hydrogen-containing isoparaffin, a catalytic condition is established which causes instantaneous alkylation of the aromatics by the isoparaffins. Thus, the invention comprises a one-step process whereby aromatics are rapidly alkylated with isoparaffins to produce alkylated aromatics in good yields.

The catalytic components of the present invention, a tertiary fluoride and BF₃, are both soluble in the present reaction mixture, at least to the extent required to achieve reaction in accordance with the present process, so that reaction occurs in the homogeneous phase. Thus, the requirement of vigorous agitation necessary to obtain intimate contact between two immiscible phases, or between a solid and liquid phase, is obviated. The instantaneous nature of the present reaction, as contrasted to the relatively long reaction times of processes heretofore known, usually several hours, eliminates the necessity for long residence times in large contactors, as heretofore required. On completion of the present reaction, a relatively small amount of sludge separates and settles out of the reaction mixture, and may be removed by decantation or other means.

By the term "tertiary fluoride," as used herein, is meant the organic fluorides wherein the fluorine atom is attached to a tertiary carbon atom, i. e., a carbon atom which in turn is attached to 3 other carbon atoms. As specific examples of tertiary fluorides, which may be employed in the present process, are: t-butylfluoride; t-amyl fluoride; 2-fluoro-2,3-dimethylbutane and other tertiary hexyl fluorides; tertiary heptyl fluorides; and 4-fluoro-2,2,4-trimethylpentane and other tertiary octyl fluorides.

The aromatics which may be employed in the process of the present invention are the alkylatable aromatics, i. e., those members of the aromatic series which have a substitutable position on the aromatic nucleus. Such aromatics include, for example, benzene, toluene, o-, m-, and p-xylenes, mixtures of xylenes, ethylbenzene, naphthalene, alpha methyl naphthalene, beta methyl naphthalene, diphenyl, the aromatics contained in hydrocarbon fractions, such as straight run fractions, and the like. In general, however, the aromatic to be alkylated should not have more than four substituent groups on the aromatic nucleus.

The saturates which may be employed to alkylate aromatics in accordance with the process of the present invention are isoparaffins and naphthenes containing at least one tertiary hydrogen atom per molecule, i. e., saturated hydrocarbons which have at least one hydrogen atom attached to a tertiary carbon atom, and which has at least 5, and less than about 30, carbon atoms per molecule. Specific examples of isoparaffins which may be employed are isopentane, 2-methylpentane, 3-methylpentane, 2-methylhexane, 3-methylhexane, 3-butyldecane, branched chain hexadecanes, heptadecanes, and the like. Specific examples of naphthenes containing a tertiary hydrogen atom which may be employed are those wherein an alkyl group is attached to a carbon atom of the naphthene ring, such as methylcyclopentane, methylcyclohexane, and the ethyl, propyl, and butyl homologs thereof, and the like. By the term, "saturate," as used herein, is intended to include isoparaffins and naphthenes as above described. Dearomatized hydrocarbon fractions containing a substantial proportion of isoparaffins and naphthenes, as above described, may be employed in the present process. Preferably, however, such a fraction should contain at least 25%, and more preferably 50%, of tertiary hydrogen-containing isoparaffins and naphthenes. It is further preferred to employ tertiary hydrogen-containing saturates other than those wherein a quaternary carbon atom is in the beta position relative to a tertiary carbon atom, since, as has been found, such saturates tend to form alkyl aromatics wherein the alkyl group contains a smaller number of carbon atoms than the alkylating saturate.

A further preferred embodiment of the present invention is to employ a hydrocarbon fraction, especially a petroleum distillate fraction, such as a straight run fraction, containing both alkylatable aromatics and tertiary hydrogen-containing isoparaffins and naphthenes. By contacting a tertiary alkyl fluoride with $BF_3$ in the presence of such a fraction, the isoparaffins and naphthenes therein are caused to alkylate the aromatics present. Additional aromatics or tertiary hydrogen-containing isoparaffins or naphthenes may be added to such a fraction in order to obtain a desired alkylated aromatic product. The added aromatics or tertiary hydrogen-containing isoparaffins and naphthenes may be the same as or different from those originally in the original fraction.

It is characteristic of the present process that the tertiary alkyl fluoride is converted to the corresponding paraffin, and that only a slight amount, usually insignificient, of alkylation of the aromatic with the hydrocarbon portion of the tertiary alkyl fluoride is observed. Primary and secondary alkyl fluorides, if employed in the present process, alkylate the aromatic with the hydrocarbon portion of the fluoride to the substantial exclusion of alkylation by the isoparaffin, and hence primary and secondary fluorides are inoperative in the process of the present invention. It is further characteristic of the present process that normal paraffins are inert, and if present act as diluents, but do not deleteriously affect the process.

The quantities of reactants to employ in the present process may be substantially varied and good results obtained therewith. Preferably from 0.25 to 4 moles of tertiary hydrogen-containing isoparaffins or naphthenes is employed for each mole of aromatic, i. e., the mole ratio of saturate to aromatic is preferably from 1:4 to 4:1. It has been found that a large excess of aromatic or saturate, while not adversely affecting the process, does not aid in increasing the yield of alkylated aromatic product. The quantity of tertiary alkyl fluoride to employ may advantageously be from 0.05 to 0.6 mole for each mole of aromatics plus saturate, i. e., a mole ratio of tertiary alkyl fluoride to aromatics plus saturate of from 1:20 to 3:5, good results being obtained when the ratio is from about 1:5 to 2:5. The quantity of $BF_3$ to employ does not appear critical, only a small amount necessary to initiate the reaction being required. From about 0.05 to 0.5 mole of $BF_3$ per mole of alkyl fluoride, i. e., a mole ratio thereof of from 1:20 to 1:2, gives good results and is preferred.

The temperature to employ in the present process may be varied widely and good results obtained therewith. It is preferred to employ temperatures of from about 0 to about 150° C. and more preferably from 20° C. to 80° C. Within these temperature ranges, the present reaction occurs practically instantaneously, and no cracking of the alkylated aromatic product is observed. Atmospheric pressure may advantageously be employed, although sub- or super-atmospheric pressures may be advantageous in some instances.

The accompanying drawing is a diagrammatic flow sheet illustrating the preferred embodiment of the present invention. Referring to the flow sheet, benzene being used to illustrate the alkylatable aromatics which may be alkylated in accordance with the present invention, is introduced through line 1. An isoparaffin of at least 5 carbon atoms per molecule and having at least 1 tertiary hydrogen atom per molecule is introduced through line 2, and a tertiary alkyl fluoride, tertiary butyl fluoride being used as illustrative, through line 4. The resulting mixture of components is passed through line 7 into heat exchanger 5, wherein the desired temperature is obtained. The mixture leaves heat exchanger 5 through line 6 and therein is mixed with $BF_3$, which is introduced through line 9, it being understood that points of introduction of the $BF_3$ and tertiary butyl fluoride could be reversed. Immediately upon the addition of the $BF_3$, i. e., the bringing together of the $BF_3$ and tertiary alkyl fluoride, a catalytic condition is established which causes the immediate alkylation of the benzene by the isoparaffin. The mixture passes into mixer 8, which is provided to insure complete reaction, but which may be omitted if desired. The reaction mixture then passes through line 10 into separator 11 wherein a lower layer is allowed to separate and is drawn from the reaction mixture through line 12. The hydrocarbon layer is removed from separator 11 through line 15 and passed to distillation zone 13. Hydrogen fluoride is easily recoverable from the acid phase, removed through line 12, by distillation (by means not shown) and may be employed in the preparation of the alkyl fluoride component of the present reaction. Distillation zone 13 may advantageously consist of a plurality of such zones by which the various fractions are separated. Isobutane, formed from the tertiary butyl fluoride, is removed through line 14. Any unreacted benzene is removed through line 16 and may be recycled through the process through line 17. Any unreacted isoparaffin is removed through line 18 and may be recycled through the process through line 19. The desired alkylated aromatic product is recovered through line 20, and high boiling products, if any are removed through line 21.

The following examples illustrate preferred embodiments of the present invention, which is not to be considered as limited thereby:

*Example 1*

A 600 cc. pressure vessel was charged with 100 g. of methylcyclohexane (1.04 moles), 41 g. of benzene (0.53 mole) and 30 g. of t-butyl fluoride (0.39 mole). With the temperature of the vessel and contents adjusted to 25° C., 8 g. of $BF_3$ (0.12 mole) was introduced. Reaction occurred practically instantaneously, i. e., as soon as the $BF_3$ was added, the reaction was complete. Heat was generated by the reaction. The initial pressure was measured as 150 p. s. i. g., and rapidly dropped to 80 p. s. i. g.

The reaction vessel was cooled and a lower layer of 26 g. was separated. The organic layer weighing 145 g., was washed with water, dried, and the components separated by distillation. The following materials, and their quantities in grams, were the major components recovered:

| | |
|---|---|
| Isobutane | 10.3 |
| Benzene | 22.8 |
| Methylcyclohexane | 68.4 |
| Methylcyclohexylbenzene | 25.0 |

Also, about 7.5 g. of residue, about 6.5 g. of an intermediate boiling material, and about 3.5 g. of t-butylbenzene were obtained. The desired alkylated benzene product, methylcyclohexylbenzene, consisted of a mixture of isomers, which had a boiling range of 246.2 to 247.6° C., $n_D^{20}=1.5181$, $d_4^{20}=0.9295$, and analyzed as follows:

| | Theozetical | Analysis |
|---|---|---|
| Carbon | 89.59 | 89.64 |
| Hydrogen | 10.41 | 10.18 |

Example 2

Three reactions were performed, the procedure being substantially identical to that employed in Example 1, except that the quantities of reactants and catalytic components were varied. The quantities of reactants, and products obtained, were as follows:

| | Reaction 1 | | Reaction 2 | | Reaction 3 | |
|---|---|---|---|---|---|---|
| | g. | moles | g. | moles | g. | moles |
| Reaction Components: | | | | | | |
| Methylcyclohexane | 99.5 | 1.01 | 49.5 | 0.51 | 148 | 1.51 |
| Benzene | 78 | 1.0 | 78 | 1.0 | 117 | 1.50 |
| Boron fluoride | 8 | 0.12 | 10.5 | 0.15 | 6.5 | 0.096 |
| t-Butyl fluoride | 32 | 0.42 | 30 | 0.39 | 61 | 0.80 |
| Products: | | | | | | |
| Lower layer | 15 | | 16.5 | | 23 | |
| Organic layer | 184 | | 143 | | 303 | |
| Isobutane | 14.5 | 0.25 | 11 | 0.19 | 25 | 0.32 |
| Benzene | 54.4 | 0.70 | 57.0 | 0.73 | 79 | 1.01 |
| Methylcyclohexane | 57.7 | 0.59 | 15.4 | 0.156 | 92.5 | 0.95 |
| t-Butylbenzene | 0.87 | 0.007 | 1.7 | 0.013 | 13.2 | 0.099 |
| Methylcyclohexylbenzene | 43 | 0.25 | 21 | 0.12 | 52 | 0.30 |
| Residue | 7.0 | | 6.5 | | 11 | |
| Intermediate boiling material | 4.0 | | 5.0 | | 6.5 | |

In the present and subsequent examples, the temperature employed was 25° C., unless otherwise stated.

Example 3

Following the procedure of Example 1, toluene was alkylated with methylcyclohexane to give methylcyclohexyltoluene. The reactants and products were as follows:

| | grams | moles |
|---|---|---|
| Reaction components: | | |
| Methylcyclohexane | 99.5 | 1.0 |
| Toluene | 92 | 1.02 |
| t-Butyl fluoride | 33.5 | 0.44 |
| Boron fluoride | 8.0 | 0.12 |
| Products of reaction: | | |
| Lower layer | 13 | |
| Recovered organic phase | 211.5 | |
| Isobutane | 16.5 | 0.285 |
| Methylcyclohexane | 61.8 | 0.63 |
| Toluene | 55.8 | 0.61 |
| t-Butyltoluene | 6.2 | 0.042 |
| Methylcyclohexyltoluene | 44.4 | 0.24 |
| Residue (in cc.) | 4 | |

The desired alkylated product, methylcyclohexyltoluene, consisted of a mixture of isomers having a boiling range of from 262 to 269° C., $n_D^{20}=1.5184$, and $d_4^{20}=0.9259$.

Example 4

Methylcyclopentane was substituted for methylcyclohexane in the procedure of Example 1. The reaction system and products obtained were as follows:

| | grams | moles |
|---|---|---|
| Reaction components: | | |
| Methylcyclopentane | 84 | 1.0 |
| Benzene | 78 | 1.0 |
| t-Butyl fluoride | 34 | 0.45 |
| BF₃ | 9 | 0.13 |
| Products recovered: | | |
| Lower layer | 17.5 | |
| Organic layer | 184.0 | |
| Isobutane | 11 | 0.19 |
| Methylcyclopentane | 63.5 | 0.76 |
| t-Butyl benzene | 4.8 | 0.036 |
| Methylcyclopentylbenzenes | 27.4 | 0.171 |
| Benzene | 45.4 | 0.58 |
| Intermediate boiling product | 5.5 | |
| Residue | 6.0 | |

Example 5

Example 4 was substantially duplicated except that 3-methylpentane was substituted for methylcyclopentane. There were obtained 22.7 g. (0.140 mole) of methylpentylbenzenes.

Example 6

A mixture of 3-methylpentane and methylcyclohexane was substituted for methylcyclohexane in the procedure of Example 1. The reaction system and products obtained were as follows:

| | grams | moles |
|---|---|---|
| Reaction components: | | |
| Benzene | 79.5 | 1.02 |
| 3-Methylpentane | 53.5 | 0.63 |
| Methylcyclohexane | 39 | 0.40 |
| t-Butyl fluoride | 33 | 0.44 |
| Boron fluoride | 12 | 0.18 |
| Products: | | |
| Lower layer | 23 | |
| Organic phase | 179 | |
| Isobutane | 8.2 | 0.14 |
| 3-Methylpentane | 39.8 | 0.46 |
| Methylcyclohexane | 26.4 | 0.27 |
| t-Butylbenzene | 13 | 0.097 |
| Methylpentylbenzenes | 11.0 | 0.068 |
| Methylcyclohexylbenzenes | 18.6 | 0.107 |
| Benzene | 44.6 | 0.57 |
| Intermediate boiling | 2 | |
| Residue | 1 | |

Example 7

A mixture of methylcyclopentane and 3-methylpentane was substituted for methylcyclohexane in the procedure of Example 1. The reaction system and products obtained were as follows:

| | grams | moles |
|---|---|---|
| Reaction components: | | |
| Benzene | 82.5 | 1.06 |
| Methylcyclopentane | 35.0 | 0.42 |
| 3-Methylpentane | 53.5 | 0.63 |
| t-Butyl fluoride | 33 | 0.44 |
| Boron fluoride | 10 | 0.15 |
| Products: | | |
| Lower layer | 20.5 | |
| Organic phase | 183 | |
| Isobutane | 12.6 | 0.22 |
| Methylcyclopentane | 16.8 | 0.20 |
| 3-Methylpentane | 38.2 | 0.44 |
| t-Butylbenzene | 5.4 | 0.040 |
| Methylcyclopentylbenzenes | 18.1 | 0.113 |
| Methylpentylbenzene | 4.0 | 0.025 |
| Benzene | 50.1 | 0.64 |
| Intermediate boiling | 8 | |
| Residue | 15.1 | |

*Example 8*

A mixture of methylcyclopentane and methylcyclohexane was substituted for methylcyclohexane in the procedure of Example 1. The reaction system and products obtained were as follows:

| | grams | moles |
|---|---|---|
| Reaction components: | | |
| Benzene | 78 | 1.0 |
| Methylcyclopentane | 34.5 | 0.41 |
| Methylcyclohexane | 59 | 0.60 |
| t-Butyl fluoride | 32 | 0.42 |
| Boron fluoride | 7 | 0.10 |
| Products: | | |
| Lower layer | 15 | |
| Organic phase | 190 | |
| Isobutane | 13.2 | 0.23 |
| Methylcyclopentane | 19.6 | 0.23 |
| Methylcyclohexane | 47.1 | 0.48 |
| t-Butylbenzene | 3.5 | 0.026 |
| Methylcyclopentylbenzenes | 19.1 | 0.119 |
| Methylcyclohexylbenzenes | 10.2 | 0.058 |
| Benzene | 55.2 | 0.708 |
| Intermediate boiling | 5.7 | |
| Residue | 8 | |

*Example 9*

A mixture of 2-methylpentane and methylcyclohexane was substituted for methylcyclohexane in the procedure of Example 1. The reaction system and products obtained were as follows:

| | grams | moles |
|---|---|---|
| Reaction components: | | |
| Benzene | 80 | 1.03 |
| t-Methylpentane | 53.5 | 0.62 |
| Methylcyclohexane | 40 | 0.41 |
| t-Butyl fluoride | 36.5 | 0.48 |
| Boron fluoride | 8.5 | 0.13 |
| Products: | | |
| Lower layer | 15 | |
| Organic phase | 176 | |
| Isobutane | 11.5 | 0.20 |
| 2-Methylpentane | 40.7 | 0.47 |
| Methylcyclohexane | 24.8 | 0.25 |
| t-Butylbenzene | 13.4 | 0.10 |
| Methylpentylbenzenes | 12.6 | 0.078 |
| Methylcyclohexylbenzenes | 15.4 | 0.089 |
| Benzene | 50.1 | 0.64 |
| Intermediate boiling | 5.2 | |
| Residue | 2.0 | |

*Example 10*

Toluene was alkylated with the 165–295° C. fraction of Webster crude which has been dearomatized by percolation through silica gel. This fraction contained a preponderance of isoparaffins, the average molecular weight being 180.7.

A pressure vessel was charged with 92 g. of toluene (1.0 mole), 150 g. of the Webster fraction (0.83 mole), and 34 g. of t-butyl fluoride (0.45 mole). Reaction was then effected by injecting 7.5 g. of $BF_3$ into the vessel. Considerable heat was generated by the reaction.

A portion of each reactant was recovered, together with 32.5 g. of alkylated toluene having an average molecular weight of about 272. The yield of alkylated toluene, based on the toluene consumed, was 46 mole per cent.

*Example 11*

This example demonstrates the effect of substituting a secondary fluoride for the tertiary fluoride in the process of the present invention.

Benzene (20 g., 0.25 mole) and 2-methylpentane (86 g., 1 mole) were introduced into a reaction vessel and cooled to 0° C. Isopropyl fluoride (25 g.) was then introduced into the liquid mixture. The stirred reaction mixture was saturated with $BF_3$ at 0° C. After warming to room temperature, 2 layers had separated.

The major products obtained were hexanes, cumene, and meta and para diisopropylbenzene. No product of alkylation of benzene by 2-methylpentane was observed.

*Example 12*

This example demonstrates the necessity for the presence of both of the present catalytic components, a tertiary alkyl fluoride and $BF_3$, to effect reaction.

Methylcyclohexane (49 g.) and t-butylbenzene (34.5 g.) were introduced into a pressure vessel and $BF_3$ (5 g.) added thereto. There was no evolution of heat, and no lower layer formed. Only starting materials were recovered on distillation.

In the foregoing examples, when other tertiary fluorides, such as t-amyl fluoride and 2,3-dimethyl-2-fluorobutane, are substituted for t-butyl fluoride, and when other alkylatable aromatics and saturates are substituted for those of the examples, substantial similar results are achieved therewith in accordance with the present invention.

In carrying out the process of the present invention it is essential that the tertiary fluoride and $BF_3$ be admixed only in the presence of both the saturate and the alkylatable aromatic; otherwise the catalytic condition established on such mixing is immediately spent. Contacting of the tertiary fluoride and $BF_3$ may be as shown accompanying flow sheet, i. e., $BF_3$ may be added to a mixture of saturate, aromatic, and tertiary fluoride. Also, the tertiary fluoride may be added to a mixture of saturate, aromatic and $BF_3$. The tertiary fluoride and $BF_3$ may be added simultaneously but separately to a mixture of saturate and aromatic. A further preferred method of contacting tertiary fluoride and $BF_3$ is to dissolve each catalytic component in separate portions of saturate, aromatic, or mixtures thereof, and to then mix such separate portions so that the tertiary fluoride and $BF_3$ are brought together in the presence of both the saturate and aromatic. Other variations within the scope of the present invention will be apparent to those skilled in the art.

The products of the process of the present invention are especially useful for the preparation of detergents and wetting agents, which may be accomplished by sulfonation and neutralization of the present products by methods known to the art.

We claim:

1. Process for the alkylation of aromatic hydrocarbons with saturates which comprises contacting in homogeneous phase at a temperature of from about 20° C. to about 80° C., in the presence of an alkylatable aromatic hydrocarbon and a saturate hydrocarbon having at least 5 carbon atoms and at least one tertiary hydrogen atom per molecule, tertiary butyl fluoride and $BF_3$, whereby interaction between said tertiary butyl fluoride and $BF_3$ establishes a catalytic condition causing the instantaneous alkylation of said alkylatable aromatic by said saturate to form an alkyl aromatic hydrocarbon having an alkyl substituent containing the same number of carbon atoms as said saturate, and separating said alkyl substituted aromatic hydrocarbon from the reaction mixture.

2. Process according to claim 1 wherein the alkylatable aromatic is benzene, and wherein the mole ratio of tertiary butyl fluoride to benzene plus saturates is from 1:20 to 3:5 and the mole ratio of $BF_3$ to tertiary butyl fluoride is from 1:20 to 1:2.

3. Process according to claim 1 wherein the alkylatable aromatic is toluene.

4. Process according to claim 1 wherein the alkylatable aromatic is xylene.

5. Process for the instantaneous alkylation in homogeneous phase of benzene with an isoparaffin having at least 5 carbon atoms and at least one tertiary hydrogen atom per molecule which comprises reacting benzene with said isoparaffin in the presence of a catalyst comprising an admixture of $BF_3$ and tertiary butyl fluoride, said admixture being prepared by bringing together said $BF_3$ and said tertiary butyl fluoride in the presence of said benzene and said isoparaffin whereby said isoparaffin alkylates said benzene, and separating from the reaction mixture an alkyl benzene wherein an alkyl group thereof has the same number of carbon atoms as said isoparaffin.

6. Process for the alkylation of aromatic hydrocarbons with saturates which comprises contacting, in the presence of an alkylatable aromatic hydrocarbon and a saturate hydrocarbon having at least 5 carbon atoms and at least one tertiary hydrogen atom per molecule, a tertiary alkyl mono-fluoride and $BF_3$ as catalytic components, said tertiary alkyl mono-fluoride having a different number of carbon atoms from said saturate when said saturate is an isoparaffin, to effect alkylation of said aromatic hydrocarbon with said saturate to form an aromatic hydrocarbon having a hydrocarbon substituent containing the same number of carbon atoms and the same naphthenic rings as said saturate, and separating the last named aromatic hydrocarbon from the reaction mixture.

7. Process according to claim 6 wherein the temperature of alkylation is from about 0° C. to about 150° C.

8. Process according to claim 7 wherein the tertiary fluoride is tertiary butyl fluoride.

9. Process for the alkylation of aromatic hydrocarbons with saturates which comprises contacting in homogeneous phase at a temperature of from about 20° C. to about 80° C., in the presence of an alkylatable aromatic hydrocarbon and a saturate hydrocarbon having at least 5 carbon atoms and at least one tertiary hydrogen atom per molecule, a tertiary alkyl mono-fluoride and $BF_3$ as catalytic components, said tertiary alkyl mono-fluoride having a different number of carbon atoms from said saturate when said saturate is an isoparaffin, whereby a catalytic condition is established which effects the instantaneous alkylation of said alkylatable aromatic by said saturate to form an aromatic hydrocarbon having a hydrocarbon substituent containing the same number of carbon atoms and the same naphthenic rings as said saturate, and separating the last named aromatic hydrocarbon from the reaction mixture.

10. Process according to claim 9 wherein the saturate is an isoparaffin.

11. Process according to claim 9 wherein the saturate is a naphthene.

12. Process for the alkylation of aromatic hydrocarbons with saturates which comprises contacting in homogeneous phase at a temperature of from about 20° C. to about 80° C., in the presence of an alkylatable aromatic hydrocarbon and a saturate hydrocarbon having at least 5 carbon atoms and at least one tertiary hydrogen atom per molecule, tertiary amyl fluoride and $BF_3$ as catalytic components, said tertiary amyl monofluoride having a different number of carbon atoms from said saturate when said saturate is an isoparaffin, whereby interaction between said tertiary amyl fluoride and $BF_3$ establishes a catalytic condition causing the instantaneous alkylation of said alkylatable aromatic by said saturate to form an aromatic hydrocarbon having a hydrocarbon substituent containing the same number of carbon atoms and the same naphthenic rings as said saturate, and separating the last named aromatic hydrocarbon from the reaction mixture.

13. Process according to claim 12 wherein the alkylatable aromatic is benzene, and wherein the mole ratio of tertiary amyl fluoride to benzene plus saturates is from 1:20 to 3:5 and the mole ratio of $BF_3$ to tertiary amyl fluoride is from 1:20 to 1:2.

14. Process according to claim 12 wherein the alkylatable aromatic is toluene.

15. Process according to claim 12 wherein the alkylatable aromatic is xylene.

16. Process for the alkylation of aromatic hydrocarbons with saturates which comprises contacting in homogeneous phase at a temperature of from about 20° C. to about 80° C., in the presence of an alkylatable aromatic hydrocarbon and a saturate hydrocarbon having at least 5 carbon atoms and at least one tertiary hydrogen atom per molecule, 2,3-dimethyl-2-fluorobutane and $BF_3$ as catalytic components, said 2,3-dimethyl-2-fluorobutane having a different number of carbon atoms from said saturate when said saturate is an isoparaffin, whereby interaction between said 2,3-dimethyl-2-fluorobutane and $BF_3$ establishes a catalytic condition causing the instantaneous alkylation of said alkylatable aromatic by said saturate to form an aromatic hydrocarbon having a hydrocarbon substituent containing the same number of carbon atoms and the same naphthenic rings as said saturate, and separating the last named aromatic hydrocarbon from the reaction mixture.

17. Process according to claim 16 wherein the alkylatable aromatic is benzene, and wherein the mole ratio of 2,3-dimethyl-2-fluorobutane to benzene plus saturates is from 1:20 to 3:5 and the mole ratio of $BF_3$ to 2,3-dimethyl-2-fluorobutane is from 1:20 to 1:2.

18. Process according to claim 16 wherein the alkylatable aromatic is toluene.

19. Process according to claim 16 wherein the alkylatable aromatic is xylene.

20. Process for the instantaneous alkylation in homogeneous phase of aromatic hydrocarbons with saturate hydrocarbons which comprises reacting an alkylatable aromatic hydrocarbon with a saturate hydrocarbon having at least 5 carbon atoms and at least one tertiary hydrogen atom per molecule in the presence of a catalyst comprising an admixture of $BF_3$ and a tertiary alkyl mono-fluoride as catalytic components, said tertiary alkyl mono-fluoride having a different number of carbon atoms from said saturate when said saturate is an isoparaffin, said admixture being prepared by bringing together said $BF_3$ and said tertiary fluoride in the presence of said aromatic and said saturate reactants, whereby said saturate alkylates said aromatic to form an aromatic hydrocarbon having a hydrocarbon substituent containing the same number of carbon atoms and the same naphthenic rings as said saturate, and separating said last named aromatic hydrocarbon from the reaction mixture.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,088,598 | Ipatieff et al. | Aug. 3, 1937 |
| 2,104,424 | Ipatieff et al. | Jan. 4, 1938 |
| 2,361,065 | Schmerling et al. | Oct. 24, 1944 |
| 2,430,661 | Axe | Nov. 11, 1947 |
| 2,433,020 | Becker | Dec. 23, 1947 |
| 2,456,119 | Friedman et al. | Dec. 14, 1948 |
| 2,469,335 | Johnson et al. | May 3, 1949 |

OTHER REFERENCES

Henne et al.: "Reactivity and Influence of Fluorine . . . " Jour. Amer. Chem. Soc., vol. 58, pp. 882-4, June 1936.

Condon et al.: Jour. Amer. Chem. Soc., vol. 70 (July 1948), pp. 2539-42.